United States Patent [19]

Hellmann et al.

[11] Patent Number: 4,906,497
[45] Date of Patent: Mar. 6, 1990

[54] MICROWAVE-ACTIVATABLE HOT-MELT ADHESIVE

[75] Inventors: Horst D. Hellmann, Reisensburg; Roland Krieger, Ulm, both of Fed. Rep. of Germany

[73] Assignee: Uzin-Werk Georg Utz GmbH & Co. KG, Ulm, Fed. Rep. of Germany

[21] Appl. No.: 267,048

[22] Filed: Nov. 4, 1988

[30] Foreign Application Priority Data

Nov. 16, 1987 [DE] Fed. Rep. of Germany ....... 3738878
Feb. 1, 1988 [DE] Fed. Rep. of Germany ....... 3802881

[51] Int. Cl.$^4$ ............................................. B32B 3/14
[52] U.S. Cl. ........................................ 428/49; 428/50; 428/87; 428/97; 428/323; 428/328; 428/349; 428/355; 428/913; 428/35.3; 428/35.1; 428/36.4; 156/78; 427/207.1; 427/372.2
[58] Field of Search ................. 428/49, 50, 87, 97, 428/323, 328, 349, 355, 913, 35.3, 35.8, 36.4; 156/78; 427/372.2, 207.1

[56] References Cited

U.S. PATENT DOCUMENTS

| | | | |
|---|---|---|---|
| 3,728,205 | 4/1973 | Brandell et al. | 428/97 |
| 3,914,489 | 10/1975 | Smedberg | 428/97 |
| 3,982,051 | 9/1976 | Taft et al. | 428/97 |
| 4,012,547 | 3/1977 | Smedberg | 428/97 |
| 4,371,576 | 2/1983 | Machell | 428/97 |

FOREIGN PATENT DOCUMENTS

| | | |
|---|---|---|
| 1938653 | 7/1969 | Fed. Rep. of Germany . |
| 2351941 | 4/1974 | Fed. Rep. of Germany . |
| 3307502 | 9/1984 | Fed. Rep. of Germany . |
| 3545600 | 6/1987 | Fed. Rep. of Germany . |
| 567563 | 11/1972 | Switzerland . |
| 1216516 | 2/1968 | United Kingdom . |

*Primary Examiner*—Patrick Ryan
*Attorney, Agent, or Firm*—Townsend and Townsend

[57] ABSTRACT

A hot-melt adhesive comprising at least one component which under the action of microwaves on the dry hot-melt adhesive leads to an increased heating-up rate compared with a corresponding dry hot-melt adhesive without said component contains with a view to universal application with highest possible activatability and constant property characteristic as microwave-activatable component electrically conductive substances with an electrical conductivity higher than that of the dry hot-melt adhesive without said component. Provided as electrically conductive substances are in particular carbon fibres, carbon black, graphite, antistatic agents and metal particles, either on their own or in mixtures adapted to the use. Hot-melt adhesive coatings or self-supporting hot-melt adhesive films having these additives have a heating-up rate by microwaves which is greater by a factor of up to 400 than that of conventional microwave-activatable adhesives. This results in an appreciable reduction of the consumption of electrical energy when adhering by microwave activation or a corresponding increase in the laying capacity of the material to be stuck. The new hot-melt adhesive is suitable preferably for microwave-activated hot-melt adhering of sheet substrates, in particular floor coverings, and by rendering the activatability largely independent of the water content of usual adhesives also achieves the uniformity and reproduceability of the activation and melting-on behavior necessary for industrial uses and production.

40 Claims, No Drawings

MICROWAVE-ACTIVATABLE HOT-MELT ADHESIVE

The invention relates to a hot-melt adhesive and a method for the production of a hot-adhesive coating and a self-supporting hot-melt adhesive sheet.

The objective is to provide a microwave-activatable hot-melt adhesive which is suitable for adhering sheet-like structures, preferably for adhering floor and wall coverings.

It is known from DE-OS No. 3,307,502 to stick floor coverings by microwave activation of a hot-melt adhesive applied to the back thereof. The microwave-activatable hot-melt adhesive itself is however not described in detail therein but in a preferred embodiment only designated "water-molecule-containing hot-seal adhesive".

The activatability of such a water-molecule-containing hot-melt adhesive by microwaves is due essentially to the relatively high dielectric constant of the water molecule. The melt-on rate of such a hot-melt adhesive thus depends on the amount of residual water retained in the dry hot-melt adhesive layer.

A disadvantage with these hot-melt adhesives microwave-activatable via the water content is that such higher water residual contents as necessary to maintain an acceptable melt-on rate can only be bound with large components of highly hygroscopic water-retaining additives in the adhesive layer. These relatively high amounts of hygroscopic additives remain in the adhesive even after complete adhesion and impair the water resistance of the adhesive bond in so far as under the action of moisture the strength of the adhesive bond can drop until it fails completely.

Another disadvantage which must be seen is that the water decisive for the activatability is only physically incorporated into the hot-melt adhesive layer and is thus in equilibrium with the ambient moisture. When the equilibrium parameters change, for example the temperature and/or the humidity, the water component in the hot-melt adhesive layer also changes and consequently a constant activatability by microwaves is in no way ensured.

DE-OS No. 3,545,600 discloses a laying backing on a non-woven fabric or woven fabric basis as support comprising a microwave-activatable hot-melt adhesive coating. For such hot-melt adhesives vinyl-acetate-containing copolymers and copolymers of the group vinyl laurate, vinyl chloride, vinylidene chloride, ethylene, propylene, butylene, isoprene, styrene, maleic acid and esters and anhydrides thereof are used as base. Specifically named as particularly preferred hot-melt adhesive base are vinyl acetate-maleinate copolymers, vinyl acetate-ethylene copolymers and vinyl acetate-acrylic ester copolymers which are available commercially as approximately 50% aqueous dispersions and can be employed directly for the use as microwave-activatable hot-melt adhesive. Corresponding to the usual production method these dispersions contain anionic or non-ionic wetting agents and polyvinyl alcohols or cellulose esters as protective colloids.

The latter substances polyvinyl alcohol or cellulose esters such as methyl cellulose, hydroxyethyl cellulose, etc., are pronounced hydrophilic water-retaining protective colloids which as already described above effect an increased equilibrium moisture in the plastic coating obtained from the dispersion by drying. The good microwave activatability of said copolymers is due primarily to this equilibrium moisture appreciably increased compared with protective-colloid-free dispersions.

Furthermore, in a particular embodiment the application is described of the microwave-activatable hot-melt adhesive to a preliminary coating which can consist of polyvinyl alcohol, pasty or degraded starch or water-soluble cellulose derivatives. Attention is drawn inter alia to the thereby increased moisture content of the hot-melt adhesive coating which promotes activatability by microwaves.

The copolymer types referred to in DE-OS No. 3,545,600 are the usual commercial thermoplasts which are known to have good hot-melt application properties and which have been used for many years as raw materials for hot-melt or hot-sealing adhesives. However, here as well the mechanism of the heating up by microwave activation is due essentially to the relatively high proportion of the water physically bound by the protective colloids in the hot-melt adhesive coating. Thus, the disadvantages discussed of microwave activatability effected by the water content apply accordingly to these hot-melt adhesives as well. In addition, the microwave activation of the known hot-melt adhesives requires a relatively large energy expenditure which is detrimental to the economy of the use.

The invention is based on the problem of making available a universally employable microwave-activatable hot-melt adhesive having the highest possible activatability and constant property characteristic.

According to the invention this problem is solved by the features characterized in claim 1. Preferred features advantageously further developing the invention are set forth in the subsidiary claims.

Departing from the use predominant in the art of microwave-activatable hot-melt adhesives in which the microwave activatability is produced above all by incorporated water components, for the hot-melt adhesive claimed it has been surprisingly found that the co-use of electrically conductive substances not only leads to hot-melt adhesives with very well reproduceable constant high activatability largely uninfluenced by climatic fluctuations but also to substantially higher heating-up rates and correspondingly higher melt-on rates for the same energy expenditure compared with known microwave-activatable hot-melt adhesives.

The heating-up rate of the hot-melt adhesive according to the invention is a factor of up to about 400 greater than that of hitherto known microwave-activatable adhesives. This remarkable increase is for example of decisive significance in the laying of floor coverings because it not only permits a considerably higher laying rate but also a substantial improvement of the laying quality. The high technical expenditure in making adhesive compounds by microwave activation must be justified by qualitatively superior cost-optimized and reproduceable working results. The hot-melt adhesive according to the invention advantageously meets these requirements to a particularly high degree.

According to a preferred further development the hot-melt adhesive comprises as binder one or more thermoplastic polymers possibly modified in a manner known per se with artificial and/or natural resins and/or additives and after application to the material to be stuck forms an adhesive coating which after drying or hardening or setting is dry and only weakly tacky to non-tacky at room temperature.

The advantageous configuration of the hot-melt adhesive as microwave-activatable adhesive coating may be used for example favourably for laying floor coverings, the back of the material provided with microwave-activatable hot-melt adhesive being laid on the foundation surface. Within a predetermined time interval a microwave generator is then moved over the top of the material whilst exerting a certain application pressure at the same time so that a specific energy radiation per unit time and unit area results. The improved activatability of the hot-melt adhesive coating leads in various respects to extremely advantageous possibilities, that is alternatively to a larger adhered area per unit time to less time required per unit area, to less energy required per unit area or to a higher melting temperature and thus improved wetting.

According to an alternative preferred further development the hot-melt adhesive comprises as binder base one or more thermoplastic polymers possibly modified in a manner known per se with artificial and/or natural resins and/or additives and after the drying or hardening or setting is formed as self-supporting sheet.

In the further development of the microwave-activatable hot-melt adhesive as self-supporting sheet, after the drying or hardening or setting without a support layer the hot-melt adhesive itself directly forms a sheet which can be used independently of any previous association with a material to be stuck. The sheet or foil can be employed universally for all uses in which an adhering with microwave activation can be carried out. It permits a particularly simple handling and ideal adaptation to the particular desired adhering conditions, for example by only punctiform or edge adhering of a covering surface or by use of several laminated sheets in applications with high adhesive requirement.

According to a further development of the invention the hot-melt adhesive sheet comprises cutouts or holes to limit the amount of hot-melt adhesive used for economic reasons. The holes may for example be made by perforation, punching or the like.

The hot-melt adhesive sheet is preferably non-tacky to slightly tacky. With the slightly tacky form a covering of nonstick paper provides an effective protection from sticking before the actual adhering. After removing the nonstick paper a weakly tacky sheet can advantageously be fixed in location before the actual microwave activation.

The thickness of the hot-melt adhesive sheet or foil is up to 5 mm, preferably 0.5–2.5 mm, and the hot-melt adhesive sheet is preferably made in webs having a width of up to 3 m.

As electrically conductive substance according to the invention carbon is preferred in the form of carbon fibres, graphites, carbon blacks or carbon black pigments. Carbon is easily and widely available in various forms and is chemically largely inert.

Particularly good heating-up rates of far more than 100 times the rate with pure binder base are obtained with carbon fibres. The length of the fibres used is not of decisive significance to the activation. For reasons of better workability of the liquid adhesive the mean fibre length is however in a range up to 50 mm, preferably in the range 0.1–5 mm.

The amount of the carbon fibres is preferably between 0.5–30% by weight and in a preferred embodiment between 2.0–16% by weight, in each case with respect to the dry hot-melt adhesive composition. The heating-up rate increases with the amount of fibre used which is restricted upwardly in fact only by the material costs and by the still necessary workability of the hot-melt adhesive.

The most important advantage when using carbon fibres apart from the greatly increased heating-up rate is that the adhesive technical properties of the hot-melt adhesive is least changed or impaired compared with all other known additives or activation-promoting additives according to the invention.

In an alternative embodiment of the hot-melt adhesives according to the invention as electrically conductive substance carbon blacks or carbon black pigments are employed. Carbon blacks or carbon black pigments also lead to an appreciable increase of the heating-up rate by microwaves, although not as pronounced as the effect of carbon fibres. The most favourable amount of said substances is in the range between 0.5–20% by weight, preferably in the range between 2–12% by weight, in each case with respect to the dry hot-melt composition.

When using carbon black or carbon black pigments the possible amount used depends essentially on the particle size. The coarser the particles the greater the amount it is possible to use. Finely particulate carbon blacks reduce the wetting properties of the melted-on hot-melt adhesive and must therefore be incorporated in lower proportions.

In a further alternative embodiment of the hot-melt adhesives according to the invention graphites are employed as electrically conductive substances. Graphites lead to a heating-up rate increase comparable to that of carbon blacks, i.e. have less effect than carbon fibres, but an appreciably greater effect than conventional microwave-activatable hot-melt adhesives. As in the case of carbon blacks excessive proportions of finely particulate graphite can lead to a reduction of the wetting properties of the melted-on hot-melt adhesive. Practicable proportions of graphite lie in the range between 2–40% by weight, preferably in the range between 4–30% by weight and particularly preferably in the range between 10–20% by weight, in each case with respect to the dry hot-melt adhesive composition.

As further alternative as electrically conductive substance metal particles in the form of powder, plates, grains, folia, fibres, or the like may be used. As metals for practical reasons in particular aluminium and copper can be employed. Fundamentally, however, the effect of increasing the heating-up rate can also be obtained with other metals. Depending on the density of the metal the proportion of metal particles may lie in the range between 1–70% by weight, preferably between 10–40% by weight, with respect to the dry hot-melt adhesive amount. The observations already made on the particle size regarding graphite apply accordingly.

As another alternative, as electrically conductive substance antistatic agents may be employed in a proportion between 0.5–20% by weight, preferably 2–10% by weight, and particularly preferably between 4–8% by weight, with respect to the dry hot-melt adhesive composition. The amount used is limited upwardly only by the compatibility of individual antistatic agents in the hot-melt adhesive system. Fundamentally, as antistatic agents all substances are suitable which due to their specific electron or charge distribution are able to dissipate and/or further conduct electrical charges, in particular chemical products which are available commercially for producing antistatic properties.

According to a further advantageous embodiment of the invention as electrically conductive substance a mixture is employed of one or more of the substances carbon fibres, carbon black or carbon black pigments, graphite, metal particles and antistatic agents. By appropriate choice of the mixture components and the respective proportions it is possible in particularly advantageous manner to obtain an optimum relationship, adapted to the particular use conditions, between the heating-up rate and the adhesive properties.

In a further development of the hot-melt adhesives according to the invention as modifying agents amino-group-containing compounds are used, so-called amines, in a proportion up to 20% by weight with respect to the dry hot-melt adhesive composition. Particularly preferred are organic primary, secondary, tertiary and quarternary amines and polyamines. By the co-use of amines an appreciable increase in the heating-up rate of the hot-melt adhesive can be achieved.

Instead of or together with amines, according to a further development of the invention as modifying agent ether-group-containing compounds may be used in a proportion up to 40% by weight with respect to the solid substance. Particularly preferred are polyethers, for example polyethylene glycols and polypropylene glycols and their derivatives, and polyvinyl ether. Just like amines, ethers also lead to an increase in the heating-up rate of the hot-melt adhesive.

As binders for the hot-melt adhesive according to the invention thermoplastic polymers or plastics or synthetic resins are employed. Preferably, thermoplasts having a narrow melting range between 60°-120° C. and as low a melting viscosity as possible are employed in order to achieve a good wettability in the melted state. By addition of suitable resins and/or waxes such as hydrocarbon resins, colophony esters, coumarone-indene resins, polyterpene resins, paraffin waxes, microwaxes, etc., the melt characteristic can be set and modified in accordance with the prior art known in the field of hot-melt adhesives. At the same time resin additives improve the adhesive properties.

Examples to be named for particularly well suited and thus preferred thermoplastic polymeric binders are vinyl acetate copolymers with one or more of the co-reactants vinyl chloride, vinylidene chloride, vinyl laurate, vinyl versatate, acrylic acid ester, maleic acid ester, maleic acid anhydride, ethylene, butadiene, isoprene, styrene, and the like. Said thermoplasts may be employed as solid resins or alternatively in the form of liquid dispersions in water with a solid content of 50-65%.

To be named as further examples of particularly well suited and thus preferred thermoplastic polymer binders are EVA, PA, PES, EEA, PVB or PIB, said binders possibly also being used in the form of solution or dispersion.

Commercially available additives, for example defoamers, thickeners, wetting agents, preservatives, stabilizers, dyes, etc., and fillers, for example quartz sand, quartz flour, chalk, stone powder, kaolin, light spar, etc., may be added to the hot-melt adhesives according to the invention. The nature and amount of additives and fillers is determined largely in accordance with the general knowledge in the art of adhesives and consequently will be known to the average expert in this art.

In a particular further development of the invention mineral fillers are specifically used having particles formed as hollow bodies and as a rule of spherical shape. Such hollow body fillers are also known per se for use in adhesives. These specifically very light fillers lead compared with conventional fillers to specifically relatively light hot-melt adhesives which although of low weight have a very good filling capacity. For the same application weight they therefore give greater layer thicknesses which after melting on lead to better wetting of the foundation surface. In addition, such hollow body fillers represent in contrast to compact fillers poor thermal conductors so that the amount of heat induced by microwave action in the hot-melt adhesive is dissipated more slowly to the surroundings and is thus available for a longer time to the melting and wetting process.

For forming a microwave-activatable hot-melt adhesive coating non-tacky at room temperature on the substrate to be stuck or for forming a self-supporting hot-melt adhesive sheet it is first necessary to apply the hot-melt adhesive by one of the application methods known in the coating art in liquid form to said substrate or in the case of sheet production to an intermediate support and subsequently allow it to set. After the drying or hardening or setting, when making a self-supporting hot-melt adhesive sheet or foil the latter is removed from the intermediate support. Suitable application methods are as a rule brushing on, rolling on, splashing on, spraying on or pouring on, including the corresponding variations such as reverse coating, reverse rolling, etc. These methods require a liquid to pasty coat consistency of the adhesive.

A particular further development of the invention relates to the nature of producing this liquid consistency necessary for the particular hot-melt adhesive application. For this purpose basically three possibilities are proposed.

According to the first method the necessary adhesive constituents are dissolved in organic solvents, or if insoluble, dispersed or suspended. Setting of the hot-melt adhesive is by evaporation of the solvents, i.e. physical drying. By increasing or reducing the solvent proportion a liquid consistency of the hot-melt adhesive which is adapted to the application method can be set. Preferred solvents are low alcohols, esters, ketones and aliphatics and mixtures thereof. An advantage of this method is the rapid drying of the hot-melt adhesive film although an increasingly stricter legislation makes technically complicated removal of the solvent vapours from the waste air necessary.

According to the second type of method the necessary hot-melt adhesive constituents are dissolved, dispersed or suspended in water. In these cases the thermoplastic hot-melt adhesive binder is preferably employed from the start in the form of an aqueous dispersion to which the further hot-melt adhesive components are then admixed in suitable manner known per se. The dispersion hot-melt adhesive resulting from this method may contain small solvent proportions to improve the working properties. An advantage of this method is the practically harmless nature of the dispersion hot-melt adhesives. Setting of these dispersion hot-melt adhesives is also by physical drying.

According to the third method for preparing the hot-melt adhesive no liquid carrier media such as solvent or water is employed; on the contrary, the adhesive is prepared as hot-melt adhesive which from a certain temperature and heat supply onwards melts and is applied in molten form. Setting in this case is not by drying but by solidification on cooling.

In accordance with the first two methods the setting of the freshly applied hot-melt adhesive is by physical drying.

This requires that the hot-melt adhesive is applied in layer thicknesses from which within acceptable drying times the volatile constituents can be removed with the drying apparatuses available to such an extent that the coated material or the hot-melt adhesive sheet made therefrom can be stacked, rolled up or otherwise further processed free from sticking. It will not always be economically justified to make hot-melt adhesive layers in the thickness necessary for adequate wetting capability.

In contrast, when applied as hot-melt adhesive it is technically simple to apply the adhesive not only in any desired thickness of the layers but also in the form of dots, strips, striaes and the like. Application in the form of elevated striae, as achieved for example also with manual adhesive application with toothed trowels, has the advantage over full-area coating that on subsequent microwave application for the same consumption a considerably better wetting of the foundation surface can be achieved.

The peculiarity of adhering by microwave activation makes it necessary, in particular when laying floor coverings on differently rought foundation surfaces, to obtain per unit area as high as possible a volume of hot-melt adhesive sufficient for filling and wetting the foundation surface. In the energy balance of the hot-melting process on the other hand it is advantageous for as little as possible hot-melt adhesive composition to have to be heated and to keep losses due to heat dissipation as low as possible. Adhesives of low density meet these requirements as already explained regarding the embodiment with hollow body fillers.

Now, a further advantageous embodiment of the hot-melt adhesives according to the invention resides in that the reduction of the density of the hot-melt adhesive layer or the hot-melt adhesive sheet is brought about in that the hot-melt adhesive is present in foamed form. This can be achieved in that the hot-melt adhesive is foamed before or during the application and then set in this form. It is however also possible to add to the hot-melt adhesive preparation a chemical foaming agent which does not produce foaming until during or after the application of the hot-melt adhesive. Corresponding methods for making mechanically or chemically foamed coatings are known in the coating art. Thus, in foamed form voluminous adhesive layers or self-supporting hot-melt adhesive sheets with good wetting properties in microwave adhering can be made without having to increase the application weight of the hot-melt adhesive for this purpose. Below the results of comparative tests are shown in which a suitable thermoplastic polymer film was heated on its own and mixed with various additives by means of microwaves until it melted. The test results apply both to the formation of the hot-melt adhesive as coating on a material to be stuck and to the formation as self-supporting hot-melt adhesive foil or sheet. The energy applied until the occurrence of the melt was obtained by the product of the power output of the microwave generator and the exposure time and defined as 1 for the pure unmodified thermoplast. The energy consumption determined for the modified thermoplast film divided by the energy consumption for the pure thermoplast then gives a dimensionless quantity which is referred to as "heating-up improvement factor" and which expresses how many times better or faster than the unmodified thermoplast the modified thermoplast can be melted.

On a microwave-inactive polyethylene foil in each case 7 g of the 50% aqueous dispersion of a typical hot-melt thermoplast (TP1 or TP2) was applied unmodified and modified in a wet layer thickness of 0.5 mm and dried for 24 h at 50° C. The dried films were then caused to melt by microwaves under the same conditions and the energy radiated into them determined as defined above:

TABLE 1

| Test Mixture (% by weight) | | Heating-Up Improvement Factor |
|---|---|---|
| TP1 | unmodified | 1.0 |
| TP1 + 4% | polyvinyl alcohol | 0.9 |
| TP1 + 4% | cellulose methyl ether | 1.2 |
| TP1 + 4% | graphite | 3.3 |
| TP1 + 4% | antistatic agent | 6.5 |
| TP1 + 4% | carbon black | 8.7 |
| TP1 + 4% | carbon fibres | 65.0 |

TABLE 2

| Test Mixture (% by weight) | | Heating-Up Improvement Factor |
|---|---|---|
| TP2 + | unmodified | 1.0 |
| TP2 + | 4% carbon fibres | 100.0 |
| TP2 + | 8% carbon fibres | 389.0 |
| TP2 + | 3% carbon black | 10.0 |
| TP2 + | 7% carbon black | 14.0 |
| TP2 + | 6% graphite | 3.0 |
| TP2 + | 12% graphite | 18.0 |
| TP2 + | 3% antistatic agent | 10.0 |
| TP2 + | 7% antistatic agent | 23.0 |

The test results clearly show the unusually high increase in the heating-up improvement factor by carbon fibre and the still considerable heating-up improvement factors of the other substances according to the invention. It is clearly apparent that the addition of hydrophilic protective colloid such as polyvinyl alcohol or cellulose ether on its own does not lead to any appreciable improvement.

Hereinafter a few recipe examples for the hot-melt adhesive according to the invention are given:

RECIPE EXAMPLE 1

Example of an adhesive composition having a very high heating up improvement factor of 395.

| Vinyl acetate-vinyl versatate copolymer dispersion 50% | 72.7% by weight |
|---|---|
| Carbon fibres | 8.0% by weight |
| Resin dispersion | 15.0% by weight |
| Defoamer | 0.3% by weight |
| Thickening agent | 0.4% by weight |
| wetting agent | 0.4% by weight |
| Filler | 3.2% by weight |

The replacement of the carbon fibres used according to the invention by an equal amount of polyvinyl alcohol leads in this case to a heating-up improvement factor of only 1.6.

RECEIPE EXAMPLE 2

Example of a relatively economical adhesive composition with the high heating-up improvement factor of 135.

| | |
|---|---|
| Vinyl acetate-vinyl versatate copolymer dispersion 50% | 50.7% by weight |
| Carbon fibres | 2.0% by weight |
| Graphite | 6.0% by weight |
| Resin dispersion | 7.0% by weight |
| Resin solution | 8.0% by weight |
| Defoamer | 0.3% by weight |
| Thickening agent | 0.4% by weight |
| Wetting agent | 0.4% by weight |
| Filler | 25.2% by weight |

RECIPE EXAMPLE 3

Example of an adhesive composition with relatively low density and a heating-up improvement factor of 153.

| | |
|---|---|
| Vinyl acetate-vinyl versatate copolymer dispersion 50% | 67.8% by weight |
| Carbon fibres | 6.0% by weight |
| Resin dispersion | 15.0% by weight |
| Defoamer | 0.3% by weight |
| Thickening agent | 0.2% by weight |
| Wetting agent | 0.5% by weight |
| Hollow body filler | 10.2% by weight |

The adhesives according to recipe examples 1–3 were applied by means of a toothed trowel in an amount of about 350 g/m², to the back of floor coverings and there dried for 24 h at 50° C. After further storing for 5 days at room temperature the adhesive-coated coverings were cut into strips 5 cm wide and activated in a microwave oven at 720 watt for 15 sec. (shear resistance) and 30 sec. (at peel resistance). The covering strips were removed from the MW oven immediately after activation and stuck with an application pressure of 0.3 N/mm² to test bodies of beechwood. After storing the adhered test bodies for 2 days at room temperature the peel resistance and shear strength were tested in accordance with DIN 53277 and DIN 53278. The resulting average values were:

| Covering Type | Peel Resistance (N/cm) | Shear Strength |
|---|---|---|
| Woven textile covering | 40–65 | 110–170 |
| Tufted floor covering | 35–50 | 150–160 |
| Rubber covering, plane | 15–25 MB | 80–90 MB |
| PVC test covering | 25–55 | 75–85 |
| Linoleum | 25–30 MB | 180–185 MB |

MB = material breakage

For forming the hot-melt adhesive as self-supporting sheet universally applicable in particular for sticking elastomeric floor coverings and carpeting, the following hot-melt recipe example may be given: 74% by weight hot melt consisting of ethylene-vinyl acetate copolymer, resin, wax, filler and additives and 26% by weight flake graphite. In this example of a hot-melt adhesive composition according to the invention investigations showed a high heating-up improvement factor of 330.

Recipe constituents for the hot-melt adhesive sheet may be varied within wide limits depending on the requirements.

We claim:

1. Hot-melt adhesive comprising at least one component which under the action of microwaves on the dry hot-melt adhesive leads to an increase heating up rate compared with a corresponding dry hot-melt adhesive without said component and thereby to a higher melting-on rate, further comprising a binder base of one or more thermoplastic polymers and a microwave-activatable electrically electrically conductive substance having an electrical conductivity greater than that of a dry hot-melt adhesive without said substance, which adhesive after application to a material to be adhered forms an adhesive coating which is dry after the drying or hardening or setting and only weakly tacky to non-tacky at room temperature.

2. Hot-melt adhesive according to claim 1, the hot-melt adhesive sheet is weakly tacky to non-tacky.

3. Hot-melt adhesive according to claim 1, wherein the thickness of the hot-melt adhesive sheet is up to 5 mm.

4. Hot-melt adhesive according to claim 1, wherein the hot-melt adhesive sheet is formed web-shaped a width of up to 3 meters.

5. Hot-melt adhesive according to claim 1, wherein said electrically conductive substance comprises carbon fibres.

6. Hot-melt adhesive according to claim 5, wherein said carbon fibres have a mean length in a range up to 50 mm.

7. Hot-melt adhesive according to claim 5, wherein said carbon fibres are provided in a proportion of 0.5–30% by weight with respect to the dry adhesive composition.

8. Hot-melt adhesive according to claim 1, wherein said electrically conductive substance comprises carbon black or carbon black pigments.

9. Hot-melt adhesive according to claim 8, wherein said carbon black or carbon black pigments are provided in a proportion of 0.5–20% by weight with respect to the dry adhesive composition.

10. Hot-melt adhesive according to claim 1, wherein said electrically conductive substance is graphite.

11. Hot-melt adhesive according to claim 10, wherein said graphite is provided in a proportion of 2–40% by weight with respect to the dry adhesive composition.

12. Hot-melt adhesive according to claim 1, wherein said electrically conductive substance comprises metal particles in the form of powder, flakes, grains, folia, fibres or the like.

13. Hot-melt adhesive according to claim 12, wherein said metal particles are provided in a proportion of 1–70% by weight with respect to the dry adhesive composition.

14. Hot-melt adhesive according to claim 1, wherein said electrically conductive substance comprises antistatic agents.

15. Hot-melt adhesive according to claim 14, wherein said antistatic agents are provided in a proportion of 0.5–20% by weight with respect to the dry adhesive composition.

16. Hot-melt adhesive according to claim 1, wherein said electrically conductive substance comprises together two or more of the substances carbon fibres, carbon black or carbon black pigments, graphite, metal particles and antistatic agents.

17. Hot-melt adhesive according to claim 1, wherein organic amines are provided as modifying agent in a proportion of up to 20% by weight with respect to the dry adhesive composition.

18. Hot-melt adhesive according to claim 1, wherein organic ethers or polyethers are provided as modifying agent in an amount of up to 40% by weight with respect to the dry adhesive composition.

19. Hot-melt adhesive according to claim 1, wherein hollow body fillers are provided having a mean particle diameter in the range of 10-90 μm.

20. Method of forming a hot-melt adhesive application on a material to be stuck in accordance with claim 1 wherein said hot-melt adhesive is prepared as solution or dispersion or emulsion in water and applied.

21. Method of forming a hot-melt adhesive coating on a material to be stuck according to claim 1, wherein said hot-melt adhesive is prepared as solution or dispersion or emulsion in organic solvents and applied.

22. Method of forming a hot-melt adhesive coating on a material to be stuck in accordance with claim 1, wherein said hot-melt adhesive is applied in molten form without volatile liquid carrier medium.

23. Method according to claim 20, wherein said hot-melt adhesive is applied in mechanically foamed form.

24. Method according to claim 21, wherein said hot-melt adhesive is applied in mechanically foamed form.

25. Method according to claim 22, wherein said hot-melt adhesive is applied in mechanically foamed form.

26. Method according to claim 20, wherein said hot-melt adhesive is foamed chemically before, during or after the application.

27. Method according to claim 21, wherein said hot-melt adhesive is foamed chemically before, during or after the application.

28. Method according to claim 22, wherein said hot-melt adhesive is foamed chemically before, during or after the application.

29. Method of forming a self-supporting hot-melt adhesive sheet or foil from a hot-melt adhesive according to claim 1, wherein said hot-melt adhesive is applied in liquid or molten-on form by means of brushing, rolling, splashing, spraying or another application method over part or all of the area to an intermediate carrier and after the drying or hardening or setting is detached from the intermediate carrier as self-supporting hot-melt adhesive foil or sheet.

30. A hot-melt adhesive sheet comprising at least one component which under the action of microwaves on the dry hot-melt adhesive leads to an increased heating up rate compared with a corresponding dry hot-melt adhesive without said component and thereby to a higher melting-on rate, a binder base of one or more thermoplastic polymers and a microwave-activatable electrically conductive substance having an electrical conductivity greater than that of a dry hot-melt adhesive without said electrically conductive substance, wherein the hot-melt adhesive is formed as a self-supporting sheet after the drying or hardening or setting of the adhesive.

31. Hot-melt adhesive according to claim 30, wherein the hot-melt adhesive is a sheet having holes formed therein.

32. A hot-melt adhesive sheet according to claim 30, wherein said electrically conductive substance comprises carbon fibres.

33. A hot-melt adhesive sheet according to claim 30, wherein said electrically conductive substance comprises carbon black or carbon black pigments.

34. A hot-melt adhesive sheet according to claim 30, wherein said electrically conductive substance is graphite.

35. A hot-melt adhesive sheet according to claim 30, wherein said electrically conductive substance comprises metal particles in the form of powder, falkes, grains, folia, fibres or the like.

36. A hot-melt adhesive sheet according to claim 30, wherein said electrically conductive substance comprises antistatic agents.

37. A hot-melt adhesive sheet according to claim 30, wherein said electrically conductive substance comprises together two or more of the substances selected from the group consisting of carbon fibres, carbon black or carbon black pigments, graphite, metal particles and antistatic agents.

38. A hot-melt adhesive sheet according to claim 30, wherein organic amines are provided as a modifying agent in a proportion of up to 20% by weight with respect to the dry adhesive composition.

39. A hot-melt adhesive sheet according to claim 30, wherein organic ethers or polyethers are provided as a modifying agent in an amount of up to 40% by weight with respect to the dry adhesive composition.

40. A hot-melt adhesive sheet according to claim 30, wherein hollow body fillers are provided having a mean particle, diameter in the range of 10 to 90 μm.

* * * * *